(12) United States Patent
Brown

(10) Patent No.: US 9,713,325 B2
(45) Date of Patent: Jul. 25, 2017

(54) INSECT ELIMINATION ASSEMBLY

(71) Applicant: Derrick Brown, Beaufort, SC (US)

(72) Inventor: Derrick Brown, Beaufort, SC (US)

( * ) Notice: Subject to any disclaimer, the term of this patent is extended or adjusted under 35 U.S.C. 154(b) by 118 days.

(21) Appl. No.: 14/802,044

(22) Filed: Jul. 17, 2015

(65) Prior Publication Data

US 2017/0013821 A1   Jan. 19, 2017

(51) Int. Cl.
  *A01M 1/16* (2006.01)
  *A01M 1/14* (2006.01)
  *A01M 1/10* (2006.01)
  *A01M 1/02* (2006.01)

(52) U.S. Cl.
  CPC .............. *A01M 1/165* (2013.01); *A01M 1/02* (2013.01); *A01M 1/106* (2013.01); *A01M 1/14* (2013.01)

(58) Field of Classification Search
  CPC .......... A01M 1/106; A01M 1/14; A01M 1/16; A01M 1/165
  USPC .................. 43/107, 114, 115, 122, 133, 136; D22/122
  See application file for complete search history.

(56) References Cited

U.S. PATENT DOCUMENTS

| | | | | |
|---|---|---|---|---|
| 3,685,199 A * | 8/1972 | Bradshaw | ............. | A01M 1/145 43/114 |
| 3,729,858 A * | 5/1973 | Bradshaw | ............. | A01M 1/145 43/114 |
| 3,820,273 A * | 6/1974 | Novak | .................... | A01M 1/04 43/113 |
| 4,069,615 A * | 1/1978 | Gilbert | ....................... | E06B 9/52 160/332 |
| 4,592,163 A * | 6/1986 | Wilson | ..................... | A01M 1/02 206/806 |
| 5,048,224 A * | 9/1991 | Frisch | ...................... | A01M 1/14 43/107 |
| 5,205,063 A * | 4/1993 | Sutherst | ............... | A01K 13/004 119/650 |
| 5,383,301 A * | 1/1995 | Babb | ........................ | A01M 1/14 43/114 |
| 6,543,180 B2 * | 4/2003 | Pace | ...................... | A01M 29/12 43/107 |
| D478,958 S | 8/2003 | Harris et al. | | |
| 7,082,712 B2 | 8/2006 | Harris et al. | | |
| 7,458,183 B2 | 12/2008 | Meier et al. | | |
| 7,469,501 B1 * | 12/2008 | Blum | ....................... | A01M 3/04 43/136 |
| 8,104,223 B1 * | 1/2012 | Rodriguez | .............. | A01M 1/14 43/114 |
| 8,356,444 B2 | 1/2013 | Pazik et al. | | |
| 8,375,624 B2 | 2/2013 | Blazer et al. | | |

(Continued)

FOREIGN PATENT DOCUMENTS

AT    GB 191326806 A *  0/1914  .............. A01M 1/16

*Primary Examiner* — Darren W Ark
*Assistant Examiner* — Danielle Clerkley

(57) ABSTRACT

An insect elimination assembly includes a housing that has a plurality of apertures extending therethrough such that each of the apertures may allow an insect to enter the housing. A plurality of hooks is provided and each of the hooks is attached to the housing. A plurality of strips is provided and each of the strips is removably suspended from an associated one of the hooks. Each of the strips is infused with a chemical insect attractant such that each of the strips may lure the insects into the housing. Each of the strips is comprised of an adhesive material such that each of the strips may capture the insects.

5 Claims, 3 Drawing Sheets

(56) References Cited

U.S. PATENT DOCUMENTS

| | | |
|---|---|---|
| 8,448,376 B2 | 5/2013 | Kagawa |
| 2008/0052982 A1 | 3/2008 | Windsor |
| 2010/0071254 A1* | 3/2010 | Calkins ................. A01M 1/145 43/107 |
| 2012/0266519 A1* | 10/2012 | Wright .................... A01M 1/02 43/113 |

\* cited by examiner

INSECT ELIMINATION ASSEMBLY

BACKGROUND OF THE DISCLOSURE

Field of the Disclosure

The disclosure relates to insect devices and more particularly pertains to a new insect device for attracting and killing insects.

SUMMARY OF THE DISCLOSURE

An embodiment of the disclosure meets the needs presented above by generally comprising a housing that has a plurality of apertures extending therethrough such that each of the apertures may allow an insect to enter the housing. A plurality of hooks is provided and each of the hooks is attached to the housing. A plurality of strips is provided and each of the strips is removably suspended from an associated one of the hooks. Each of the strips is infused with a chemical insect attractant such that each of the strips may lure the insects into the housing. Each of the strips is comprised of an adhesive material such that each of the strips may capture the insects.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
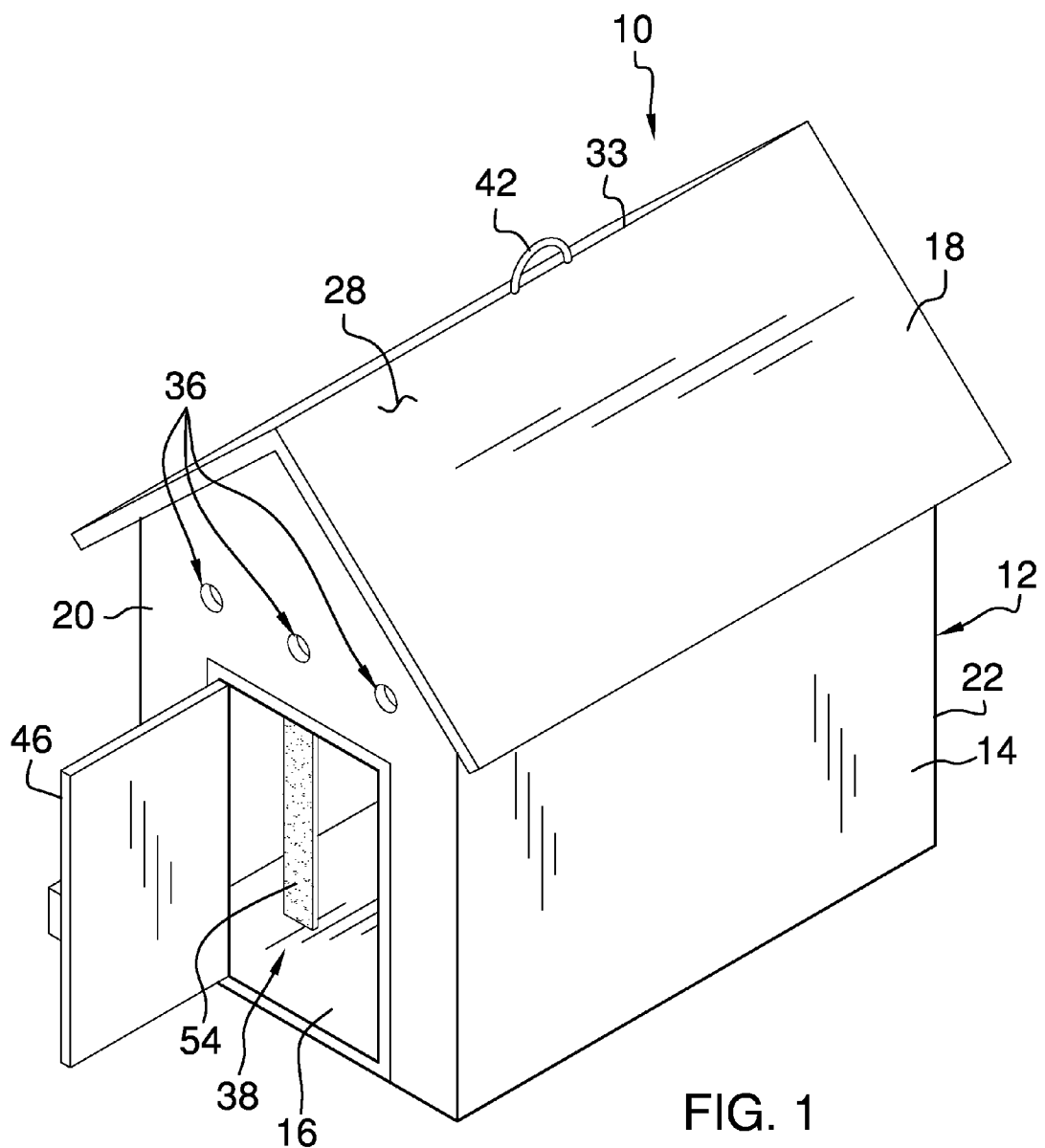
FIG. 1 is a front perspective view of an insect elimination assembly according to an embodiment of the disclosure.
Figure 3:
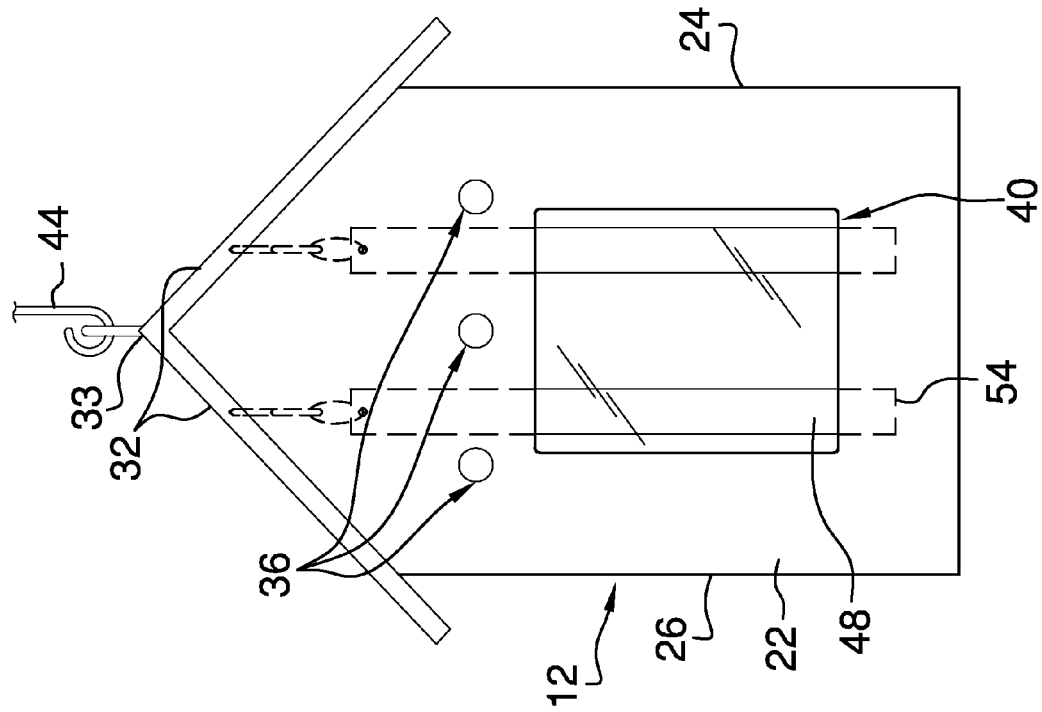
FIG. 3 is a back view of an embodiment of the disclosure.
Figure 2:
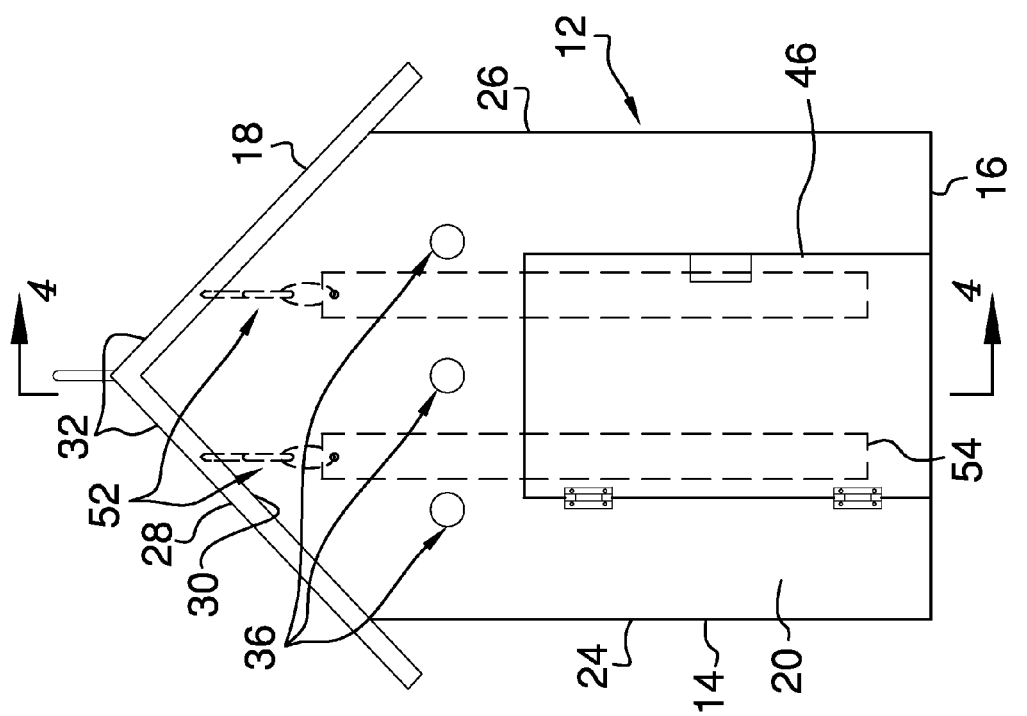
FIG. 2 is a front view of an embodiment of the disclosure.
Figure 4:
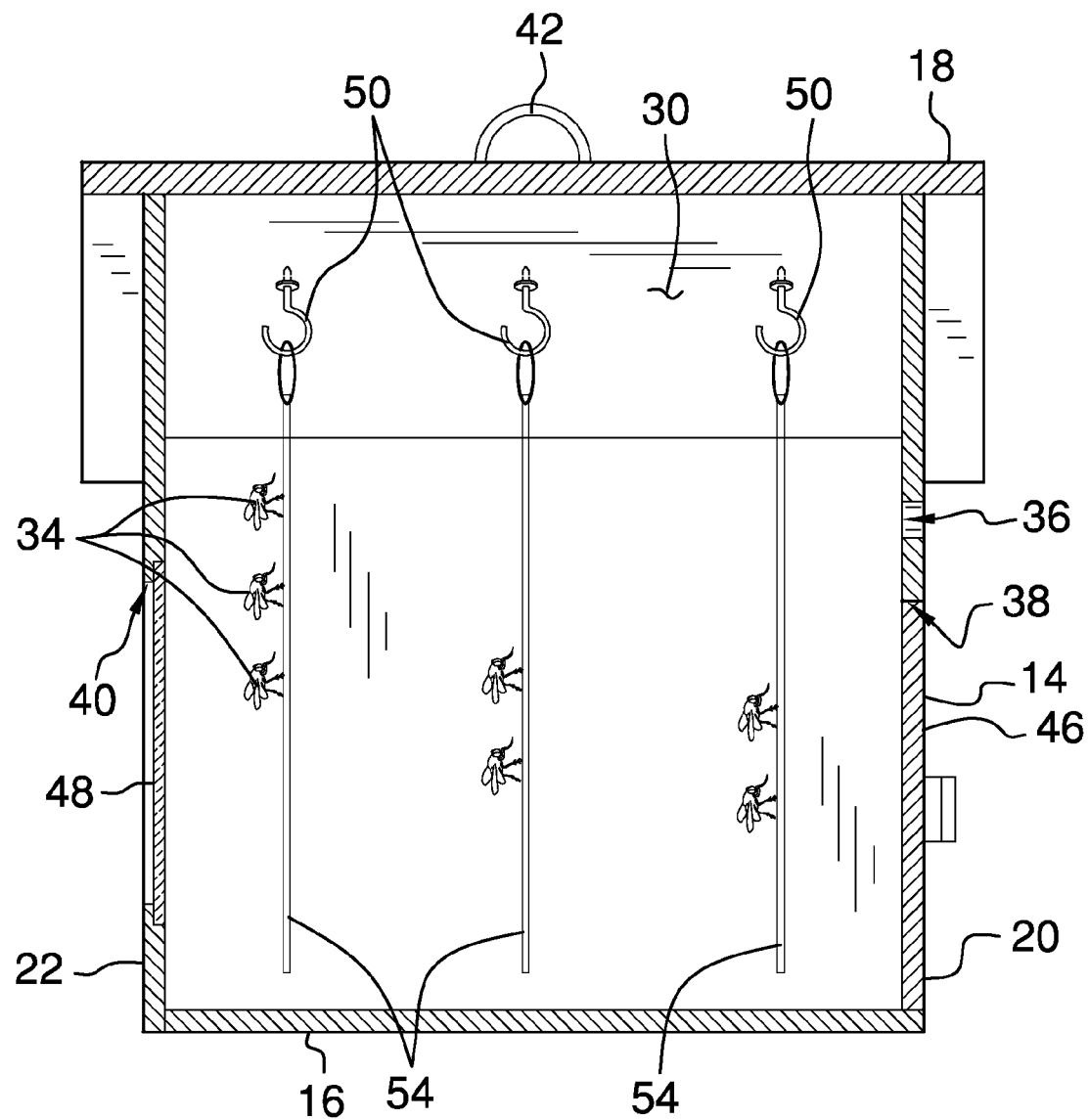
FIG. 4 is a cross sectional view taken along line 4-4 of FIG. 2 of an embodiment of the disclosure.

With reference now to the drawings, and in particular to FIGS. 1 through 4 thereof, a new insect device embodying the principles and concepts of an embodiment of the disclosure and generally designated by the reference numeral 10 will be described.

As best illustrated in FIGS. 1 through 4, the insect elimination assembly 10 generally comprises a housing 12 that has an outer wall 14, a floor 16 and a roof 18. The outer wall 14 has a front side 20, a back side 22, a first lateral side 24 and a second lateral side 26. The roof 18 has a top surface 28 and a bottom surface 30 and the roof 18 comprises a pair of panels 32. Each of the panels 32 is pitched such that each of the panels 32 slopes outwardly and downwardly from an apex 33. Thus, the housing 12 attracts insects 34 and the insects 34 may be flying, nest building insects that typically build nests on or within a building.

Each of the front side 20 and the back side 22 have a plurality of apertures 36 extending therethrough such that each of the apertures 36 may allow the insects 34 to enter the housing 12. The insects 34 may be bees, wasps, hornets or other flying, stinging insects. The apertures 36 are spaced apart from each other and are distributed between the first lateral side 24 and the second lateral side 26. The front side 20 has a first opening 38 extending therethrough to access an interior of the housing 12 and the back side 22 has a second opening 40 extending therethrough.

A hanger 42 is attached to the housing 12 and the hanger 42 is positioned on the apex 33 of the roof 18. Thus, the hanger 42 may engage a support 44 such that the housing 12 is suspended from the support 44. The support 44 may be a hook or the like that is elevated a distance above ground. A door 46 is hingedly coupled to the housing 12 and the door 46 is positioned on the front side 20 such that the door 46 selectively closes the first opening 38. A window 48 is coupled to the housing 12 and the window 48 is positioned on the back side 22 such that the window 48 completely covers the second opening 40.

A plurality of hooks 50 is provided and each of the hooks 50 is attached to the housing 12. Each of the hooks 50 engages the bottom surface 30 of the roof 18 such that each of the hooks 50 is positioned within the interior of the housing 12. The plurality of hooks 50 are spaced apart from each other and distributed between the front side 20 and the back side 22 of the housing 12. Additionally, the hooks 50 are arranged into a pair of rows 52 and each of the rows 52 is positioned on an associated one of the panels 32.

A plurality of strips 54 is provided and each of the strips 54 is removably suspended from an associated one of the hooks 50. Each of the strips 54 is infused with a chemical insect attractant such that each of the strips 54 lures the insects 34 into the housing 12. Each of the strips 54 is comprised of an adhesive material such that each of the strips 54 captures the insects 34 when the insects 34 land on the strips 54. Each of the strips 54 may comprise bug strips of any conventional design.

In use, the plurality of strips 54 is suspended from the associated hook 50 and the door 46 is closed to cover the front opening 38. The housing 12 is suspended from the support 44. Each of the strips 54 is replaced when each of the strips 54 becomes covered with the insects 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An insect elimination assembly comprising:
   a housing having a plurality of apertures extending therethrough wherein each of said apertures is configured to allow an insect to enter said housing, said housing having an outer wall, a floor and a roof, said outer wall having a front side, a back side, a first lateral side and a second lateral side, said roof having a top surface and a bottom surface, said roof comprising a pair of panels, each of said panels being pitched such that each of said panels slopes outwardly and downwardly from an apex, said apertures being arranged into a first line of apertures extending through said front side, said first line of apertures being spaced apart from each other and distributed between said first lateral side and said second lateral side, said front side having a first opening extending therethrough, said first line of apertures being positioned over said first opening;
   a door being hingedly coupled to said housing, said door being positioned on said front side such that said door selectively opens to provide access to an interior of said housing, said door being positionable to close said first opening and each of said first lateral side, said second lateral side, said roof, and said floor being uninterrupted whereby said interior of said housing is accessible only through said apertures;
   a plurality of hooks, each of said hooks being attached to said housing; and
   a plurality of strips, each of said strips being removably suspended from an associated one of said hooks, each of said strips being infused with a chemical insect attractant wherein each of said strips is configured to lure the insects into said housing, each of said strips being comprised of an adhesive material wherein each of said strips is configured to capture the insects.

2. The assembly according to claim 1, further comprising a hanger being attached to said housing, said hanger being positioned on said roof wherein said hanger is configured to engage a support such that said housing is suspended from the support.

3. The assembly according to claim 1, further comprising:
   said plurality of apertures including a second line of apertures extending through said back side, said second line of apertures being spaced apart from each other and distributed between said first lateral side and said second lateral side;
   said back side having a second opening extending therethrough, said second line of apertures being positioned over said second opening; and
   a window being coupled to said housing, said window being positioned on said back side such that said window completely covers said second opening.

4. The assembly according to claim 1, wherein each of said hooks engages said bottom surface of said roof such that each of said hooks is positioned within said interior of said housing.

5. An insect elimination assembly comprising:
   a housing having an outer wall, a floor and a roof, said outer wall having a front side, a back side, a first lateral side and a second lateral side, said roof having a top surface and a bottom surface, said roof comprising a pair of panels, each of said panels being pitched such that each of said panels slopes outwardly and downwardly from an apex, a house, each of said front side and said back side having a plurality of apertures extending therethrough wherein each of said apertures is configured to allow an insect to enter said housing, said apertures being arranged into a first line of apertures extending through said front side, said first line of apertures being spaced apart from each other and distributed between said first lateral side and said second lateral side, said front side having a first opening extending therethrough, said first line of apertures being positioned over said first opening, said plurality of apertures including a second line of apertures extending through said back side, said second line of apertures being spaced apart from each other and distributed between said first lateral side and said second lateral side, said back side having a second opening extending therethrough, said second line of apertures being positioned over said second opening;
   a hanger being attached to said housing, said hanger being positioned on said roof wherein said hanger is configured to engage a support such that said housing is suspended from the support;
   a door being hingedly coupled to said housing, said door being positioned on said front side such that said door selectively opens to provide access to an interior of said housing, said door being positionable to close said first opening and each of said first lateral side, said second lateral side, said roof, and said floor being uninterrupted whereby said interior of said housing is accessible only through said apertures;
   a window being coupled to said housing, said window being positioned on said back side such that said window completely covers said second opening;
   a plurality of hooks, each of said hooks being attached to said housing, each of said hooks engaging said bottom surface of said roof such that each of said hooks is positioned within said interior of said housing; and
   a plurality of strips, each of said strips being removably suspended from an associated one of said hooks, each of said strips being infused with a chemical insect attractant wherein each of said strips is configured to lure the insects into said housing, each of said strips being comprised of an adhesive material wherein each of said strips is configured to capture the insects.

* * * * *